United States Patent
Griffin

[11] Patent Number: 6,126,225
[45] Date of Patent: Oct. 3, 2000

[54] TONNEAU COVER

[76] Inventor: Gary Griffin, 7228 Bursey Rd., North Richland Hills, Tex. 76180

[21] Appl. No.: 09/014,132
[22] Filed: Jan. 27, 1998

Related U.S. Application Data

[60] Provisional application No. 60/034,079, Jan. 28, 1997.
[51] Int. Cl.$^7$ ...................................................... B60P 7/02
[52] U.S. Cl. .................................................... 296/100.02
[58] Field of Search ........................... 296/26.05, 100.02, 296/100.03, 104, 105, 208, 213

[56] References Cited

U.S. PATENT DOCUMENTS

| | | | |
|---|---|---|---|
| 3,649,072 | 3/1972 | Cross | 296/137 B |
| 4,889,381 | 12/1989 | Tamblyn et al. | 296/98 |
| 4,943,194 | 7/1990 | Aguilar | 410/132 |
| 5,251,950 | 10/1993 | Bernardo | 296/98 |
| 5,427,428 | 6/1995 | Ericson et al. | 296/98 |
| 5,851,059 | 12/1998 | Cirocco | 312/334.11 |

OTHER PUBLICATIONS

"Road Test: The 1998 GMC Sonoma" from the www.ride-anddrive.com webiste, Aug. 1998.

*Primary Examiner*—D. Glenn Dayoan
*Assistant Examiner*—PaUL Chenevert
*Attorney, Agent, or Firm*—Felsman Bradley Vaden Gunter & Dillon, LLP; James E. Bradley

[57] ABSTRACT

A pick-up truck having a bed with a front wall, two side walls, and a tailgate, has a tonneau cover installed over the bed. The tonneau cover comprises a pair of outer channels, a pair of inner channels, and several panels. Each of the channels has a C-shaped cross-section. Each outer channel is tapered along its length from front to back. The outer channels are mounted near the upper ends of the side walls. The inner channels are mounted in the outer channels. The panels are slidably mounted between the inner channels and extend from the front wall to the tailgate. The tonneau cover may be adapted for use with pick-up truck beds having parallel side walls or beds having side walls which taper inward from front to back.

14 Claims, 2 Drawing Sheets

TONNEAU COVER

This invention claims the benefit of U.S. Provisional Application Ser. No. 06/034,079, filed Jan. 28, 1997.

TECHNICAL FIELD

This invention relates in general to automobiles, and in particular to a tonneau cover for a pick-up truck.

BACKGROUND ART

Pick-up truck owners often utilize a variety of devices to provide a covering for the bed of their truck.

One type of covering is a camper top. Camper tops secure to and cover the bed of the truck and are typically designed to mount flush with the height of the cab of the truck. Although camper tops create a large volume of usable space beneath the top, camper tops significantly alter the profile or aesthetic appearance of trucks.

Another type of truck bed covering is a tonneau cover. Tonneau covers are also designed to cover the bed of a truck. However, tonneau covers typically mount flush with the side walls of the bed so that the profile of the truck is very similar to a truck with an uncovered bed. Although tonneau covers create less usable space than camper tops, some truck owners prefer to maintain a traditional truck profile.

Some prior art tonneau covers are designed to fit truck beds with parallel side walls. However, some truck manufacturers have changed the design of truck beds to taper such that the cab or front end of the bed is wider than the tailgate or rear end of the bed. Another problem with prior art tonneau covers is limited display options. Prior art tonneau covers are designed to match or coordinate with the color of the body of truck. While this feature is desirable, some truck owners would prefer to change the color scheme or graphic display of their tonneau cover. What is needed is a reversible or interchangeable tonneau cover that fits truck beds with parallel side walls as well as tapered truck beds.

DISCLOSURE OF THE INVENTION

A pick-up truck having a bed with a front wall, two side walls, and a tailgate, has a tonneau cover installed over the bed. The tonneau cover comprises a pair of metal channels, a pair of plastic channels, and several panels. Each of the channels has a C-shaped cross-section. Each metal channel is tapered along its length from front to back. The metal channels are mounted near the upper ends of the side walls. The plastic channels are mounted in the metal channels. The panels are slidably mounted between the plastic channels and extend from the front wall to the tailgate. The tonneau cover may be adapted for use with pick-up truck beds having parallel side walls or beds having side walls which taper inward from front to back.

BEST MODE FOR CARRYING OUT THE INVENTION

Figure 1:
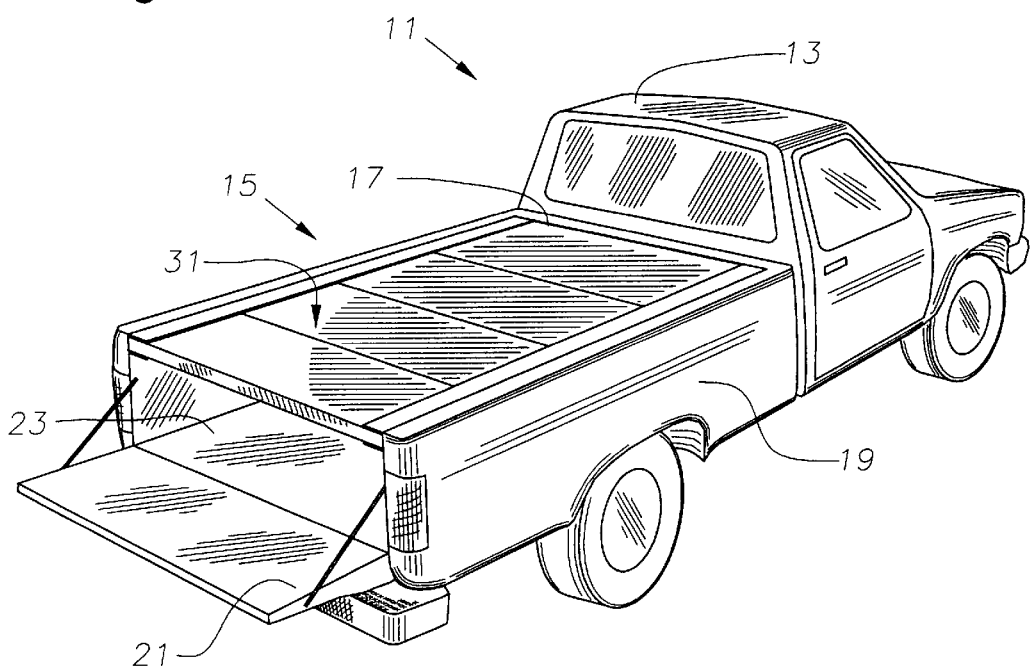
FIG. 1 is a schematic drawing of a tonneau cover installed in the bed of a pick-up truck and is constructed in accordance with the invention.

Referring to FIG. 1, a pick-up truck 11 with a cab 13 and a bed 15 is shown. Bed 15 has a front wall 17, two side walls 19, and a tailgate 21. Side walls 19 taper inward or converge from front wall 17 to tailgate 21 and, thus, are not parallel. A tonneau cover assembly 31 is installed across the upper portion of bed 15. With assembly 31 in place and tailgate 21 in an upright and secured position, a storage area 23 is defined.

Figure 2:
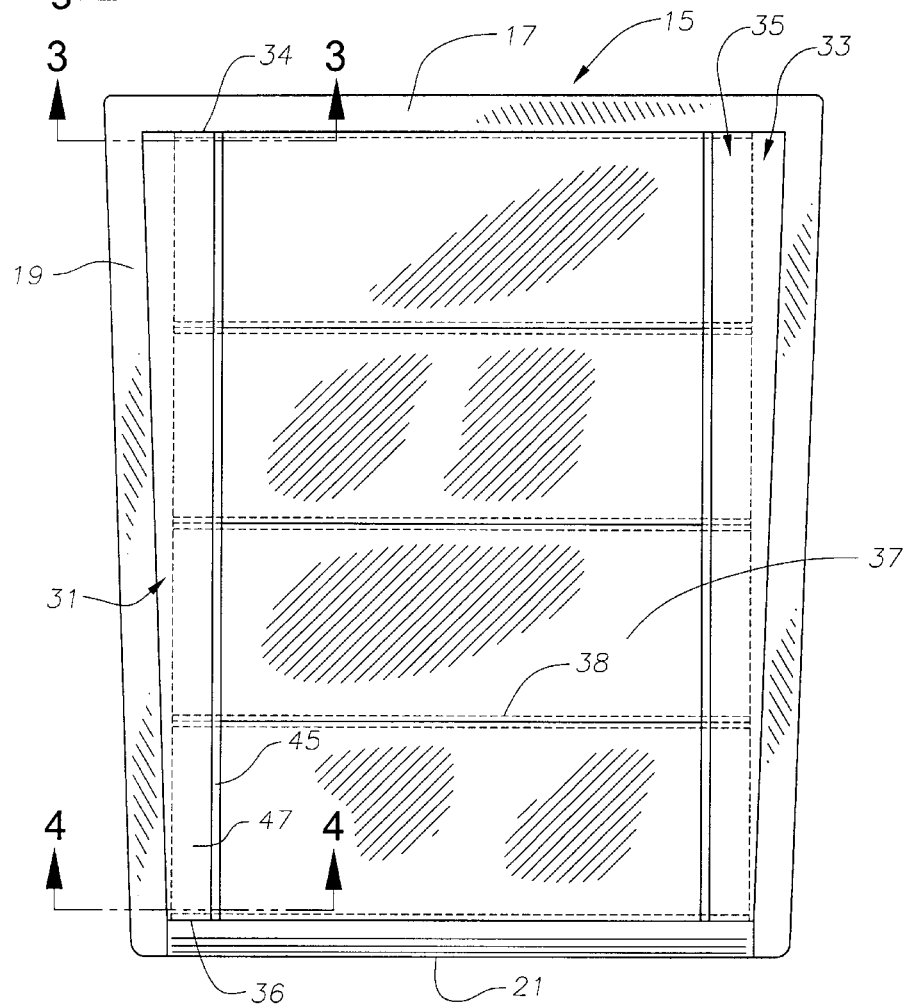
FIG. 2 is a schematic top view of the tonneau cover of FIG. 1.
Figure 3:
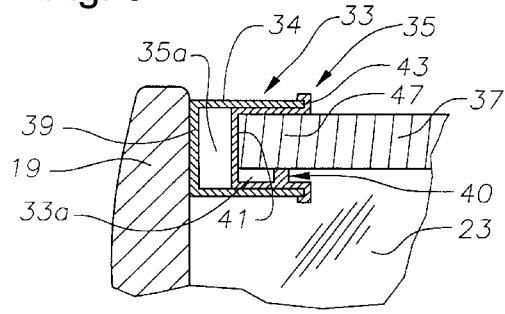
FIG. 3 is a rear view of the tonneau cover of FIG. 2 taken along the line 3—3 at the cab of the pick-up truck.
Figure 4:
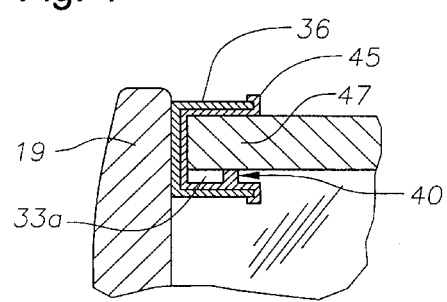
FIG. 4 is a rear view of the tonneau cover of FIG. 2 taken along the line 4—4 at the tailgate of the pick-up truck.

Referring to FIGS. 2–4, assembly 31 comprises a pair of frame members or outer channels 33, a pair of parallel, inner or plastic channels 35, and a plurality of panels or sections 37. Channels 33 and 35 are both C-shaped in cross-section and are the same length as the interior length of bed 15. Each of the channels 33, 35 has an inward-facing, elongated, rectangular receptacle or cavity 33a, 35a, respectively, with an open inner end. Each of the cavities 33a, 35a are defined between upper and lower walls which are joined by an outer end wall 39, 41, respectively. Each outer channel 33 is tapered along its length such that the forward end 34 is wider than the rearward end 36, thereby allowing its inner and outer edges to converge toward one another from front to back. Plastic channels 35 have a constant, rectilinear width and are preferably extruded. Channels 35 have substantially the same width as the rearward end 36 of outer channels 33. In one embodiment, plastic channel 35 is provided with an interior ridge 40 that runs the full length of plastic channels 36. Ridge 40 elevates sections 37, thereby allowing any water trapped within plastic channel 35 to easily escape.

Outer channels 33 are rigidly installed with fasteners (not shown) in bed 15 along the upper, interior lengths of side walls 19 such that the outer end walls 39 of outer channels 33 abut side walls 19. The forward ends 34 of outer channels 33 abut an inner surface of the front wall 17 of bed 15 while rearward ends 36 abut an inner surface of upright tailgate 21. Outer channels 33 are symmetrically located on opposite sides of bed 15. Outer channels 33 have inner edges 43 which are parallel to one another. The outer end walls 39 between the two outer channels 33 are farther apart at the forward ends 34 than at the rearward ends 36. Because of the taper in width, the open side edges 43 of outer channels 33 are parallel to each other. The outer end wall 41 of each channel 35 is adjustably or slidably received by the inner edges 43 of each outer channel 33. Each channel 35 has a pair of lips 45 that receive and abut the inner edges 43 of an outer channel 33. Lips 45 secure channels 35 to outer channels 33 and prevent movement therebetween. When installed, channels 35 have the same symmetrical configuration as outer channels 33. The width between the two outer end walls 41 of channels 35 is constant throughout the length of the bed. Thus, channels 35 are parallel to each other while portions of outer channels 33 converge toward one another from front to back.

Sections 37 are rectangular and formed from a lightweight material, such as ABS plastic. In one embodiment (not shown), a thin plastic laminate is bonded to an upper surface of each section 37. In another embodiment (not shown), each section 37 is a rectangular perimeter, hollow ABS plastic frame sandwiched between two sheets of Lexan and covered with vinyl having a thickness of 2 ml. Preferably, an eight year UV vinyl is used. Sections 37 are closely and slidingly received by and abut channels 35 along outer edges 47 so that they extend transversely across bed 15 between sidewalls 19. Sections 37 abut one another along their widths. Preferably, sections 37 seal against one another, front wall 17 and tailgate 21 with elastomeric seals or weatherstripping 38 (indicated by dashed lines). In alternate embodiments, the upper and lower surfaces of sections 37 may be reversibly colored or contain interchangeable graphic designs.

In operation, one outer channel 33 is fastened to each side wall 19 of bed 15. A plastic channel 35 is inserted into each outer channel 33. The forward side of outer edges 47 of a section 37 is placed within channels 35. Section 37 is then slidably mounted or pushed through channels 35 until section 37 abuts front wall 19. The remaining sections 37 are similarly in installed in channels 35, with each remaining section 37 abutting the preceding section 37. Sections 37 may be installed in any order and with either the upper or lower surfaces facing upward to create a variety of color and graphic schemes.

The invention has several advantages. The dual channel design compensates for tapered pick-up truck bed designs. The sections contain interchangeable graphic designs and colors to create a variety of tonneau cover displays. Finally, the assembly comprises very few parts and is easy to install.

While the invention has been shown in only one of its forms, it should be apparent to those skilled in the art that it is not so limited, but is susceptible to various changes without departing from the scope of the invention.

I claim:

1. A tonneau cover for a bed of a pick-up truck having a front wall, two side walls and a tailgate, comprising:
   a frame member adapted to be rigidly mounted near an upper end of each of the side walls of a pick-up truck;
   a channel closely received by and stationarily mounted to each of the frame members so as to be parallel to each other, each of the channels having upper and lower walls joined by an outer wall on an outer side and a longitudinally extending slot on an inner side;
   at least one panel having a pair of outer edges, each of the outer edges closely and slidably received by one of the slots of the channels, the panel adapted to extend over the bed of the pick-up between the front wall, the tailgate and the two side walls; and
   an interior ridge on the lower wall in each of the channels for contacting and supporting a lower surface of each of the outer edges of said at least one panel, defining a chamber between the outer wall and the ridge to allow water to flow longitudinally out of said channels.

2. The tonneau cover of claim 1 wherein each of the frame members has a longitudinal opening along an inner edge for receiving one of the channels, wherein the openings have a height dimension that is substantially equal to a height dimension from the lower wall to the upper wall of each of the channels to enable the channels to be inserted laterally into the frame members through the openings.

3. The tonneau cover of claim 1 wherein each of the frame members has a generally C-shaped cross-section, defining a rectangular cavity with an outer wall, upper and lower walls, and a longitudinally extending opening along an inner side, and wherein each of the channels fits closely within the cavity.

4. The tonneau cover of claim 3 wherein each of the channels has an upper lip and a lower lip along the inner side of the channel that contact the upper and lower walls, respectively, at the inner side on one of the frame members.

5. The tonneau cover of claim 1 wherein each of the frame members is tapered longitudinally, having a greater width at one end than an opposite end, so that the tonneau cover is adapted to mount on a pick-up truck having sidewalls that taper inward from the front wall to the tailgate.

6. The tonneau cover of claim 1 wherein said at least one panel comprises a plurality of rectangular panels, each of which may be slidably mounted between the channels.

7. The tonneau cover of claim 1 wherein each of the frame members has an outer edge and an inner edge which converge toward one another from front to back, and each of the channels has a constant width from front to back.

8. A tonneau cover for a bed of a pick-up truck having a front wall, two side walls and a tailgate, comprising:
   a pair of frame members, each having a length extending from a front end to a back end, and a width extending from an inner edge and an outer edge, the width decreasing from the front end to the back end, each of the frame members being adapted to be mounted near an upper end of one of the side walls of a pick-up truck which has side walls which converge from front to back, wherein the inner edges of the frame members are parallel to each other because of the decreasing widths;
   a pair of parallel, substantially constant width inner channels, each having an inward-facing elongated cavity, each of the inner channels being stationarily mounted to one of the frame members; and
   a plurality of panels closely received by and slidably mounted to the cavities of the inner channels, the panels adapted to extend transversely across the bed of the pick-up between the two side walls.

9. The tonneau cover of claim 8 wherein each of the frame members has an upper wall and a lower wall joined by an outer wall which defines a rectangular cavity with an open inner side, wherein the outer walls of the outer channels are adapted to be mounted to the side walls of the pick-up truck.

10. The tonneau cover of claim 9 wherein each of the channels has an upper lip and a lower lip which contact inner edges of the upper and lower walls, respectively, on one of the frame members.

11. The tonneau cover of claim 8 wherein the inward-facing elongated cavity of each of the channels has a ridge therein for contacting and elevating a lower surface of each of said panels above a lower portion of each of the inner channels for allowing water to easily pass out of said inner channels.

12. The tonneau cover of claim 8, further comprising weatherstripping located between each of the panels.

13. A tonneau cover for a bed of a pick-up truck having a front wall, two side walls and a tailgate, comprising:
   a pair of converging outer channels, each having an upper wall and a lower wall joined by an outer end wall, the upper and lower walls defining a rectangular cavity with an open inner end, wherein each of the outer channels is adapted to be mounted near an upper end of one of the side walls of the pick-up truck;
   a pair of parallel inner channels, each having an inward-facing, elongated cavity, and wherein each of the inner channels is closely received by and stationarily mounted in the cavity of one of the outer channels; and
   a plurality of panels closely received by and slidably mounted to the cavities of the inner channels, the panels adapted to extend transversely across the bed of the pick-up between the two side walls; and
   an upward extending ridge within the cavity of each of the inner channels for contacting and supporting a lower surface of each of the panels to allow water to flow out of the inner channels.

14. A tonneau cover for a bed of a pick-up truck having a front wall, two side walls and a tailgate, comprising:
   a pair of converging outer channels, each having an upper wall and a lower wall joined by an outer end wall which defines a rectangular cavity with an open inner end, each of the outer channels adapted to be rigidly mounted near an upper end of each of the side walls of the pick-up truck;

a pair of parallel inner channels, each having an inward-facing, elongated cavity, and wherein each of the inner channels are mounted to one of the outer channels; and a plurality of panels slidably mounted to the cavities of the inner channels, the panels adapted to extend transversely across the bed of the pick-up between the two side walls;

a ridge within each said inward-facing elongated cavity of said inner channels for contacting and supporting a lower surface of each of said panels to allow water to easily pass out of said inner channels; and wherein each of the inner channels has an upper lip and a lower lip which contact inner edges of the upper and lower walls, respectively, on one of the outer channels.

* * * * *